Dec. 24, 1929.           B. H. McGUIRE                1,740,997
                       STUFFING BOX GLAND
                       Filed April 20, 1927
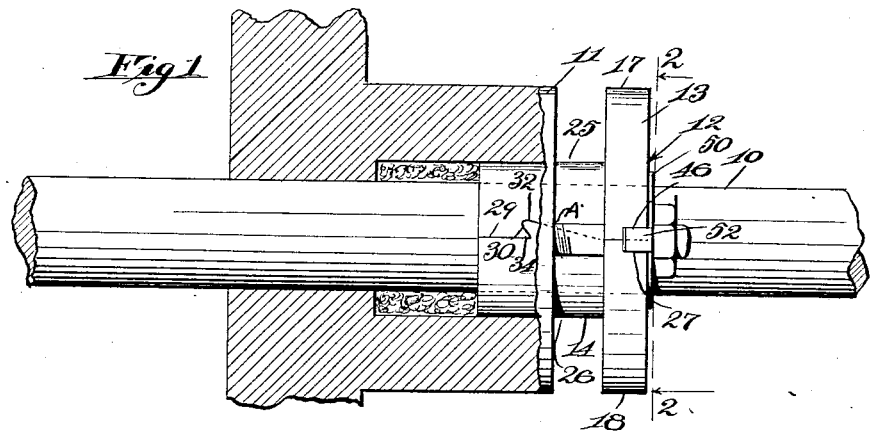
Inventor
B. H. McGuire
by Hazard and Miller
Attorney Patented Dec. 24, 1929

1,740,997

UNITED STATES PATENT OFFICE

BERNARD H. McGUIRE, OF LOS ANGELES, CALIFORNIA

STUFFING-BOX GLAND

Application filed April 20, 1927. Serial No. 185,159.

This invention relates to stuffing-box glands, and it is an object of the invention to provide a gland which may readily be removed from the stuffing-box and from the shaft which it surrounds, without disassembling other parts of the machine or device which employs the stuffing-box. Heretofore, it has been a decided disadvantage in that when stuffing-box glands were to be replaced, a considerable amount of labor was necessarily expended in disassembling the machine elements in order that the gland could be removed and replaced. My invention consists in a stuffing-box gland formed in two sections—one on each side of the shaft, and novel means for removably holding these sections in position.

A still further object of my invention is to provide a stuffing-box gland which is strong and durable in its operation, inexpensive to manufacture, is unlikely to get out of order and is well adapted to perform the services required of the same.

With these and many other objects in view which will more readily appear as the nature of the invention is better understood, the same consists in the novel construction, combination, and arrangement of parts, which will hereinafter be more fully described, illustrated, and claimed.

The essential features of the invention involved in the carrying out of the objects indicated are susceptible to modification; but a preferred embodiment of the invention is shown in the accompanying drawings, in which:

Figure 1 is a sectional view of my device in its assembled relation shown applied to a stuffing-box, and parts of the stuffing-box being broken away.

Fig. 2 is a sectional view taken substantially along the lines 2—2 of Figure 1.

Fig. 3 is a side view of the stuffing-box gland showing the two sections separated.

Fig. 4 is an end view of the disclosure shown in Figure 3.

In manufacturing the device, while the various elements thereof may be constructed in any suitable manner and of any suitable material, it is preferable to form the same from machine steel castings on account of the cheapness and strength of the latter; but irrespective of these details of manufacture, the essential features of the invention are always preserved.

In the drawings, a shaft and stuffing-box are represented by the numerals 10 and 11 respectively, and the stuffing-box gland involving the principles of my invention, is designated as an entirety at 12. This stuffing-box gland is formed in two sections or halves 13 and 14, having internal journal surfaces 15 and 16 adapted to receive the shaft 10. Each section is provided with an attaching flange 17 and 18, and a pair of semi-circular recesses 19 and 21, 20 and 22 respectively are so formed in these attaching flanges that when the two sections are assembled upon each other, these recesses define closed apertures 23 and 24, which apertures are formed on opposite sides of the shaft 10 and symmetrically disposed in the attaching flanges. The journal surfaces 15 and 16 are defined by semi-circular flanges 25 and 26, having contacting edges 27 and 29, 28 and 30 respectively. The edges 28 and 30 are each provided with a projection 32 and 34, and the edges 27 and 29 are provided with complementary recesses 33 and 35, adapted to receive the projections on the section 14. As a further means for retaining the device in assembled relation, a dowel pin 36 and a recess 37 are formed respectively on the sections 14 and 13. Semi-circular grooves 41 and 43 are formed on the attaching flange 17 of the member 13. These grooves are comparatively wide and have an internal diameter slightly larger than the diameter of the semi-circular recesses 19 and 21. These grooves are formed adjacent these recesses. Similarly, the attaching flange 18 and the piece 14 is provided with semi-circular grooves 42 and 44, similar in their nature to the grooves 41 and 43 so that when the two pieces are assembled upon each other, an upstanding flange 45 surrounds the apertures 23 and 24 thus formed in assembling the device. These circular grooves are provided with cutout portions 46 and 47, and these grooves are adapted to receive suitable washers or holding pieces 49 and 50. Each of these washers is provided with a downwardly extending lug 51 and 52, which is adapted to be received in these cut-out portions. The lugs 51 and 52 of the washers 49 and 50 respectively, being at right angles to the plane of the washers themselves, extend along the vertical edges of the two complementary halves 13 and 14 of the stuffing box gland and aid the operator to manipulate the assembled stuffing box gland by holding the same and engaging both the lugs 51 and 52 between his thumb and finger respectively, or by both hands. The stuffing-box is provided with threaded apertures A, adapted to receive the bolts that extend through the apertures 23 and 24 when the device is assembled, and hold the washers firmly in place in the recess.

The operation of my device is quite evident. The stuffing-box gland may be readily installed or removed. It is merely necessary to pull the stuffing-box gland from the stuffing-box where it has engagement with the packing, remove the washers 49 and 50 so that the sections may be separated. By the provision of the dowel pin 36 and the so called lap abutment between the flanges 25 and 26, it is assured that each section will enter the stuffing-box at the same rate of speed and perfect alignment of the stuffing-box gland will be insured. The heads of the bolts inserted through the apertures 19 and 21, bear firmly against the washers 49 and 50 and retain the same in their respective grooves. Furthermore, the lap connection between the sections aids the action of the stuffing-box packing, preventing escape of fluid or gas through the same.

From the foregoing, it is thought that the construction, use and many advantages of the herein-described stuffing-box gland will be readily apparent without further description, and it will also be understood that changes in the form, proportion, and minor details of construction may be resorted to without departing from the spirit of the invention or sacrificing any of the advantages thereof.

What I claim as my invention and desire to secure by Letters Patent is:

1. The combination with a stuffing-box having a shaft extending therethrough, of a stuffing-box gland formed in two complementary sections, each section comprising an attaching flange and a semi-circular flange adapted to bear against said shaft, said semi-circular flanges presenting two pairs of opposed edges, said attaching flanges presenting opposed edges, semi-circular recesses on said last mentioned edges, said recesses adapted to form apertures when said sections are assembled, marginal grooves surrounding said recesses, cut-out portions adjacent said grooves, and washers receivable in said grooves, each washer having a lug receivable in said cut-out portions.

2. The combination with a stuffing box, having a shaft extending therethrough, of a stuffing box gland formed in two complementary sections, each section comprising an attaching flange and a semi-circular flange adapted to bear against said shaft, said semi-circular flanges and said attaching flanges presenting opposed edges, semi-circular recesses on the opposed edges of said attaching flanges, said recesses adapted to form apertures when said sections are assembled, marginal grooves surrounding said recesses, and washers receivable in said grooves, each washer having a lug at right angles to the plane thereof and adapted to engage the opposing side edges of said attaching flanges, there being grooves in which portions of said lugs are receivable.

3. The combination with a stuffing box, having a shaft extending therethrough, of a stuffing box gland formed in two complementary sections, each section comprising an attaching flange and a semi-circular flange adapted to bear against said shaft, said flanges presenting opposed edges, recesses on said attaching flanges adapted to form apertures when said sections are assembled, washers about said recesses provided with lugs at right angles to the planes of the washers and adapted to engage the side edges of the attaching flanges.

In testimony whereof I have signed my name to this specification.

BERNARD H. McGUIRE.